United States Patent Office 3,475,385
Patented Oct. 28, 1969

3,475,385
POLYESTERAMIDES
Isaac Goodman and Neville Robert Hurworth, Runcorn, England, assignors to Imperial Chemical Industries Limited, London, England, a corporation of Great Britain
No Drawing. Filed Mar. 30, 1966, Ser. No. 538,545
Claims priority, application Great Britain, Apr. 2, 1965, 14,106/65
Int. Cl. C08g 20/30
U.S. Cl. 260—78                                    16 Claims

ABSTRACT OF THE DISCLOSURE

Polyesteramides which are solids melting or softening above 60° C. and containing macromolecular chains consisting essentially of ester units of the structure

—O—(CH$_2$)$_5$—CO— diamine units of the structure —NH—R—NH— and dicarbonyl units of the structure —COR'—CO— where R and R' are each divalent organic radicals containing at least two carbon atoms and wherein the two nitrogen atoms are attached to different carbon atoms in R and the two carbonyl groups are attached to different carbon atoms in R', there being from 2 to 2000 of the other units for every 50 ester units in the polymer chains, said polymers being useful as melt adhesive, moulding material and fiber forming material.

---

This invention relates to polyesteramides.

Broadly, our invention provides solid polyamides of the kind derived notionally from the polycondensation of diamines with diacids but which have been modified by the introduction of alkylene carboxylate groups derived from a lactone. Quite unexpectedly we have found that even where the polymers are made up predominantly of our specified lactone residues, they retain largely polyamide-like characteristics. On the other hand, by the introduction of relatively small concentrations of lactone we have found that the chemist may obtain desirable modifications in the properties of the polyamides, the nature and extent of the modification being dependent upon the nature of the original polyamide and the amount of lactone introduced. The modifications obtained could not have been predicted from general observations of the effects of co-polycondensations, including the behaviour of other polyesteramides.

According to the present invention we provide polyesteramides which are solids melting or softening above 60° C. and containing macromolecular chains consisting essentially of ester units of the structure

—O—(CH$_2$)$_5$—CO— diamine units of the structure —NH—R—NH— and dicarbonyl units of the structure —CO—R'—CO— where R and R' are each divalent organic radicals containing at least two carbon atoms and wherein the two nitrogen atoms are attached to different carbon atoms in R and the two carbonyl groups are attached to different carbon atoms in R', there being from 2 to 2000 of the other units for every 50 ester units in the polymer chains.

R and R' may be the same or different and each of R and R' may vary from unit to unit along the polymer chains.

By melting we mean losing crystallinity as indicated by loss of birefringence in a sample heated at a rate of 1° C. per minute and observed under a polarising microscope. By softening we mean the losing by a solid of its form by collapse into liquid state, as observed during visual microscopic examination of a sample being heated at a rate of 1° C. per minute. While melting generally occurs at a sharply defined temperature, softening generally occurs over a range of temperature.

Our invention provides the polymer technologist with a new class of thermoplastic materials which show a considerable range of properties. In general, the properties of any given polymer within the scope of our invention are a function of the nature of R, the nature of R' and the concentration and distribution of ester units in the polymer chain but overall our polyesteramides range from amorphous materials softening at temperatures of 60° C. and upwards and useful, for example, as melt adhesives, to highly crystalline high melting tough thermoplastics melting at temperatures of 180° C. or more and useful primarily as moulding and fibre-forming materials. In general, they will all be characterised by a molecular weights corresponding to intrinsic viscosities (measured in m-cresol at 25° C.) of at least 0.2 and preferably at least 0.4, although there may be little advantage in exceeding 2.0.

While the invention is directed principally to polyesteramides the polymer chains of which contain only units having the structures —O—(CH$_2$)$_5$—CO—
—NH—R—NH—
and
—CO—R'—CO— it also includes within its ambit polyesteramides the polymer chains of which are formed from the above units (which may be in random or block relationship) together with other units which may be introduced into the chain, for example by adding suitable copolymerisable monomers to the polymerisation mixture, and which may provide up to 10 units per 100 units of the polymer chain. Our polyesteramides will generally be found to consist of units having the structure —O—(CH$_2$)$_5$—CO—
and
—NH—R—NH—CO—R'—CO— there being from 1 to 1000 of the latter units for every 50 ester units in the polymer chain.

Any primary diamine and any dicarboxylic acid may be used in the derivation of our polymers so long as they do not contain groups which would prevent polycondensation e.g. by reaction with the lactone; the only essential requirements for success are that the diamine contains two —NH$_2$ groups linked to different carbon atoms and the diacid contains two —COOH groups linked to different carbon atoms. R and R' may each be divalent hydrocarbon groups which may be alkylene, arylene, aralkylene or alkarylene (the term alkylene including cycloalkylene) or substituted derivatives thereof, the common substituents being halogen atoms and groups having the structure —OR" where R" is a monovalent hydrocarbon radical or a halogenated derivative thereof. Alternatively, the groups R and R' may compirse chains or groups of carbon atoms, e.g. as in aromatic nuclei, linked together with hydrocarbyl-substituted imino groups and/or oxygen and/or sulphur atoms, for example as in —(CH$_2$)$_2$O(CH$_2$)$_2$—
and
—C$_6$H$_4$—SO$_2$—C$_6$H$_4$— or substituted derivatives of these in which the substituents are selected from —OR" (where R" is as defined above) and halogen atoms.

It will be appreciated that if desired R and R' may be modified after the polymerisation reaction to form groups which could have prevented the formation of the polyesteramides.

Because of their ready availability and the useful properties of the polymers derived therefrom, we have found alkylene diamines to be very suitable, particularly polymethylene diamines containing from 2 to 20 methylene groups, e.g. ethylene, trimethylene, tetramethylene, pentamethylene, hexamethylene (particularly), octamethylene, decamethylene, dodecamethylene, octadecamethylene and eicosamethylene diamines. Alicyclic diamines such as hexahydro-meta- and -para-xylylene diamines may also be used when relatively highly crystalline and high-melting polyesteramides are required. When lower melting and/or less crystalline polyesteramides are required according to the invention, it is convenient to use branched-chain aliphatic diamines such as propane-1:2-diamine, butane-1:2-diamine, butane-1:3-diamine, butane-2:3-diamine and the C-methyl or C-ethyl substituted derivatives of e.g. trimethylene, tetramethylene, pentamethylene and hexamethylene diamines. Aliphatic diamines containing two or more chains of two or more carbon atoms each chain being linked to the next by —O— or —N(alkyl)— can also be used, e.g. 2:2'-diaminodiethyl ether 3:3'-diaminodipropyl ether, 4:4' - diaminodibutyl ether, 5:5'-diaminodiamyl ether, N-methyliminodipropylamine and N,N'-di-ω-aminoalkyl piperazines and bipiperidyls. Such diamines may also be used as secondary components to provide lower melting points and wider thermoplastic ranges than would be obtained using the polymethylene diamines alone. Other usfeul diamines include meta-xylylene diamine para-xylylene diamine, di-4-aminocyclohexylmethane, and compounds containing two benzene rings linked by an oxygen or sulphur atom or by one or more carbon atoms, e.g. diamines of diphenylsulphone, diphenylether, diphenyl methane and diphenyl-2:2-propane; the amino groups preferably being meta or para to the bridging atom or group.

With regard to the acid component, the polymethylene α,ω-dicarboxylic acids or the more symmetrical aromatic dicarboxylic acids are chosen when high-melting and more highly crystalline polyesteramides are required, and the less symmetrical aromatic dicarboxylic acids or the C-methyl or C-ethyl substituted alkane dicarboxylic acids are chosen when lower crystallinity, lower melting points and a wider thermoplastic range are required. Examples of useful dicarboxylic acids are the polymethylene-α-ω-dicarboxylic acids,e.g., succinic, glutaric, adipic, pimelic, suberic, azelaic, sebacic, and dodecanediodic acid, dicarboxylic acids derived from the dimerisation of unsaturated aliphatic monocarboxylic acids, e.g., linoleic acid; the aromatic acids such as the isomeric phthalic acids, and their alkyl, halogeno- and alkoxy-substituted derivatives. The use of isophthalic acid and its halogeno- and alkoxy-derivatives is especially indicated when polyesteramides of low crystallinity and wide thermoplastic range are required. Other useful aromatic dicarboxylic acids include naphthalene dicarboxylic acids, biphenyl dicarboxylic acids, diphenoxyalkane dicarboxylic acids, and acids of the structure:

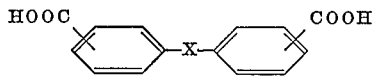

where X is —O—, —S—, —SO$_2$—, —CO—, or a divalent hydrocarbon group, e.g., —CH$_2$—, —(CH$_2$)$_2$— and

—C(CH$_3$)$_2$

In each case the position of attachment of the carboxylic acid groups may be chosen corresponding to the properties desired in the polyesteramides but is preferably meta or para to X. The cyclohexane dicarboxylic acids and homoterephthalic acid are also useful reactants for the preparation of the polyesteramides of the invention, as are linear aliphatic dicarboxylic acids containing —O— and —N(alkyl)— groups linking chains of two or more carbon atoms. Ether acids, e.g., of the formula

where $m=0$ or an integer, may also be used. Where $m$ has a large value, e.g., from 15 upwards, the products according to the invention can be regarded as block copolymers incorporating the polyesteramide structure.

Mixtures of two or more diamines with one or more dicarboxylic acids, or of one diamine with two or more dicarboxylic acids may be used to form the amide units in our polyesteramides.

As has been stated hereinbefore, the nature of the polyesteramide depends upon the nature of R, the nature of R' and the concentration and distribution of ester groups through the polymer chains. By way of example, the particular properties of some of the polymers are described below.

Very useful, generally crystalline, moulding thermoplasts may be obtained where both R and R' are polymethylene groups. A very interesting series is obtained where R is —(CH$_2$)$_6$— and R' is —(CH$_2$)$_n$— where $n$ is from 4 to 12 and is preferably an even number; i.e., 4, 6, 8, 10 or 12. In general, the melting points are reduced with increase in the concentration of ester units and with increase in polymethylene groups in R'. Where relatively high melting materials are required, e.g., to give polymers melting above 180° C. and useful as moulding materials, we prefer the ratio of ester units to the total number of —NH—R—NH— and —CO—R'—CO units to be from 1 to 0.05:1, the particular ratio range depending upon the exact nature of R'. Where lower melting products are desired e.g., as melt adhesives melting in the range 60–180° C., the ratios are generally from 1 to 20:1 and particularly from 2:1 to 10:1. However, it should be appreciated that these limits are not exclusive; for example, fibre-forming polymers may be obtained at most ratios. A property to be noted in these thermoplasts is that mixtures of acids may be used without causing any great change in the properties of the products.

The polymers wherein R is —(CH$_2$)$_6$— and R' is —m—C$_6$H$_4$— are generally hard clear resins which show brittle fractures as made but they are plasticised by moisture.

Those wherein R is —(CH$_2$)$_6$— and R' is —p—C$_6$H$_4$— may only be made readily where the ratio of ester units to the total number of —NH—R—NH— and

—CO—R'—CO— units in the polymer chains is at least 30:70 because below this ratio the polyamide from hexamethylene diamine and terephthalic acid tends to precipitate from the melt. Above this ratio, however, the products obtained may be formed into fibres showing elastomeric properties. If some of the terephthalic acid is replaced by adipic acid, white tough horny crystalline materials of high melting point may be obtained.

Polymers wherein R' is a mixture of —m—C$_6$H$_4$— and —p—C$_6$H$_4$—, R being —(CH$_2$)$_6$—, are generally transparent tough and often amorphous moulding plastics of which the softening point varies with ester content. Ratios of 5 to 7 ester units to 4 —NH—R—NH— plus —CO—R'—CO— units are preferred for moulding materials and the ratio of —m—C$_6$H$_4$— to —p—C$_3$H$_4$— is preferably in the range 4:1 to 1:4.

Polymers wherein R is derived from p-xylylene diamine and R' is —(CH$_2$)$_4$— have been found to be bulk elastomers, particularly when the ratio of ester units to —NH—R—NH— plus —CO—R'—CO— units is from 2:1 to 6:1.

Polymers where R is derived from 4,4'-diaminodiphenyl ether and R' is —(CH$_2$)$_4$— are generally hard tough crystalline materials, the preferred ratio of ester to other units being from 5:1 to 1:5.

Our polyesteramides are derived notionally from ε-caprolacetone, at least one dicarboxylic acid

HOOC—R'—COOH and at least one diamine $H_2N$—R—$NH_2$. They may be formed in a number of ways but particularly:

(1) By reacting ε-caprolactone with diamine and dicarboxylic acid under conditions such that in th absence of the lactone the diamine and diacid would polycondense to high molecular weight polyamide, (i.e. having a molecular weight of at least 5000);

(2) By reacting ε-caprolactone with diammonium dicarboxylate salt formable from the diamine and diacid of (1), the conditions being such that in the absence of lactone, the salt would polymerise to high molecular weight polyamide as defined in (1) or (3) By reacting ε-caprolactone or its polymer with molten polyamide formed from the diamine and the diacid of (1).

In all these reactions, the lactone may be replaced by any other compound which will ultimately yield in the macromolecular chains of the polymer so produced units of the structure —O—$(CH_2)_5$—CO—; e.g. 6-hydroxy caproic acid, 6-acyloxy caproic acid and esters, particularly lower alkyl esters, of these acids. By lower alkyl, we mean linear alkyl containing from 1 to 6 carbon atoms. Similarly, the diamine and diacid may be replaced by polycondensable derivatives thereof.

The particular reaction is chosen to suit the starting materials but method (2) is generally preferred because of its flexibility.

Reactions (1) and (2) are generally effected by heating the components together and in the first reaction it is essential that the diamine and diacid are used in equimolar or substantially equimolar amounts; i.e. the concentration of neither one exceeding the other by more than 2 and preferably 0.5 mole percent. If the concentration of either component exceeds the other by much over 2 mole percent only low molecular weight products are obtained, generally in the form of viscous liquids, oils, waxy materials or friable solids which have little or no intrinsic strength and are useful only e.g. as plasticisers or intermediates in the formation of high polymers. These form no part of our invention which is only concerned with polymers which are solids melting or softening above 60° C. and having measurable mechanical properties such that they are useful as structural materials, e.g. for conversion to unsupported films, fibres or moulded articles, or as bonding agents for structural materials.

The temperature of the reaction in any of routes 1–3 will depend to some extent upon the choice of constituents and upon the molecular weight desired in the resultant polyesteramides. We have found that temperatures of from 150 to 300° C. are generally effective but the use of higher temperatures for extended periods of time (longer than a few minutes) may result in discoloured products. In our experience, consistently good results may be obtained from a process which involves a first stage wherein the reactants are melted together at a temperature of up to about 220° C. and a second stage wherein the product is subjected to a temperature above that of the first stage, and preferably of the order of from 210 to 270° C., until the polymerisation has achieved the desired conversion. It is advantageous but not necessary to effect the second stage under partial vacuum conditions and preferably at pressures below 1 mm. of mercury absolute. A rapid stream of inert gas, e.g. nitrogen, may be used to blow out low molecular weight by-products.

The presence of oxygen in the reaction is not advised and it is generally preferred to effect the polymerisation in an atmosphere of inert gas, conveniently nitrogen. Water may be tolerated but it is preferred to minimise its concentration and to use dry apparatus, anhydrous reagents and dry gas streams. An acidic compound may be added to the reaction mixture to aid polymerisation, if desired. Examples of such compounds are those normally used as catalysts for polycondensation reactions; e.g. sulphuric acid, phosphoric acid, benzene sulphonic acid, and p-toluene sulphonic acid.

While our invention is directly primarily to polymers formed of macromolecules containing units of the structure —O—$(CH_2)_5$—CO—, —NH—R—NH— and —CO—R'—CO, we also include the addition to the ester generating compound and the amide-generating material (i.e. the mixture of diamine and diacid or the diammonium dicarboxylate or polyamide) of small amounts of other active materials, if desired. These may be monofunctional in order to cause chain termination or polyfunctional, e.g. difunctional or trifunctional, where it is desired to modify the polymer chains by the addition of units other than those specified as the essential units in the polymer chain. The use of tri- or higher polyfunctional units may lead to the production of cross-linked resins. The modifying compounds that may be added are any mono or polyfunctional compounds known to be active in polycondensation reactions. Generally these are compounds containing one or more active hydrogen atoms, e.g. as in —OH, —NH— and —COOH groups, and they may be used in amounts to yield up to 10 units per 100 repeating units of the polymer chain.

On completion of the polymerisation reaction, the polymeric products may be removed and purified in any suitable manner. Normally, no special procedure is required and the products obtained after cooling may be sued as such. These polyesteramides are solid materials and range from amorphous resins to tough crystalline solids, depending upon the choice and ratio of the units making up the polymer chain. They may be modified with additives such as heat and light stabilizers, mould lubricants, release agents, pigments, dyes and fillers (e.g. fibrous glass, asbestos, and ground glass, graphite, carbon black, $MoS_2$, metals and metal oxides) and blended with other plastic materials, natural or synthetic.

The polymers are particularly useful as melt adhesives (especially those melting or softening in the range 60–180° C. and particularly wherein R is —$(CH_2)_6$— and R' is —$(CH_2)_4$— and at least 10 mole percent of the units in the polymer chain are

—NH—R—NH—CO—R'—CO— units), and as materials for moulding, shaping into films, converting into coatings and spinning into fibres, especially where they melt or soften above 140° C. The wide plastic range of many of them also makes them of use for blowing into foams.

The invention is now illustrated but in no way limited by the following examples in which all parts are expressed as parts by weight except where otherwise indicated. In these examples, inherent, intrinsic and reduced viscosities were all measured on solutions of the polymers in m-cresol at 25° C. unless indicated otherwise.

Reduced viscosity is defined as the value obtained for $$\frac{t-t_o}{t_o.c}$$

where $t$=flow time of a solution of the polymer at a concentration of $c$ gms. decilitre$^{-1}$ in a solvent through a specified viscometer. $t_o$=flow time through the same viscometer of a similar volume of the solvent. Intrinsic viscosity is the value found for $$\frac{t-t_o}{t_o.c}$$

at zero concentration by extrapolating to zero the curve obtained by plotting reduced viscosity values at varying solution concentrations.

Inherent viscosity is the value obtained for $$\frac{\log (t/t_o)}{c}$$

The physical properties such as initial modulus, yield stress and elongation at break were measured on a Type E Hounsfield Tensile Tester at a strain rate of 100%/minute using specimens having the British Standard dumb-bell shape, Type C, as specified in British Standard 903.

Example 1

This example describes the preparation of a 1:1 molar copolymer of 6-oxycaproyl units with ethylene adipamide units.

ε-Caprolactone (21.6 parts) was treated under nitrogen with ethylene diamine (11.4 parts). After 15 minutes, adipic acid (27.7 parts) was added when an exothermic reaction occurred. The mixture was then heated to 160–180° C. to melt the components together, a current of nitrogen being continuously passed through the mixture, and p-toluene sulphonic acid (0.05 part) was added as a catalyst for the polymerisation reaction. The reactants were then maintained at 190° C. for 1 hour at 1 atmosphere pressure of nitrogen, after which the pressure was gradually reduced during 45 mins. to 0.05 mm. Hg, and the reaction was allowed to proceed for 2.5 hours. Water was evolved and the contents of the vessel solidified. The reaction temperature was finally raised to 210° C. when the solid re-melted, and the process was completed by maintaining at 210° C. and 0.05 mm. Hg for 30 minutes. The product was a yellowish, hard friable solid melting over 205–207° C. Its inherent viscosity (as a 1% solution in anhydrous formic acid at 25° C.) was 0.13.

Example 2

This example describes the preparation of a 1:2 molar copolymer of 6-oxycaproyl units with hexamethylene adipamide units.

The nylon salt hexamethylene diammonium adipate (74.4 parts), ε-caprolactone (16.2 parts) and p-toluene sulphonic acid (0.05 part) were melted together at 200° C. under an atmosphere of nitrogen at normal pressure. Water was evolved, and after 45 minutes solid began to separate from the melt. The temperature was then raised to 260° C. and, with continued passage of nitrogen, the pressure was reduced during 1 hour to 0.05 mm. Hg. Reaction was completed by maintaining the contents of the vessel at 260° C. and 0.05 mm. Hg for a further 3 hours. The highly viscous melt solidified on cooling to a white, horny solid, crystalline to X-rays and having an intrinsic viscosity of 0.84. Strong drawable fibres could be prepared from the melt. The crystalline melting point of the material was 229–230° C.

Example 3

A 2:1 molar copolymer of 6-oxycaproyl units with hexamethylene adipamide units was prepared by the reaction of ε-caprolactone (54 parts) with hexamethylene diammonium adipate (62 parts). In this case no catalyst was used. The co-reactants were heated together under nitrogen at 200° C. to form a clear melt, and maintained at 205–220° C. at normal pressure for 1 hour when a vigorous evolution of water vapour occurred. The temperature was then raised to 250–260° C. and the pressure reduced to 0.05 mm. Hg during 3 hours, and the reaction was allowed to proceed for a further 2½ hours when a highly viscous melt was obtained. After cooling, the product formed a crystalline solid mass melting over 156–159° C. and having an intrinsic viscosity of 0.44. Strong fibres could readily be spun from the melt.

In contrast to poly-ε-caprolactone this copolymer did not dissolve in hot benzene, chloroform, acetone or toluene.

Example 4

A 1:4 molar copolymer of 6-oxycaproyl units with hexamethylene adipamide units was prepared by the reaction of ε-caprolactone (7.56 parts) with hexamethylene diammonium adipate (69.4 parts). These reactants together with p-toluene sulphonic acid (0.05 part) as catalyst were melted together under nitrogen at 200° C. as in Example 3. The melt quickly solidified, and the reactants were re-melted by heating to 260° C. After 1 hour the pressure was reduced to 0.05 mm. Hg whereupon a rapid increase in the viscosity of the melt was observed, and the reaction was completed by maintaining this temperature and pressure for a further 5 hours. The product after cooling was a white, crystalline, horny solid, melting over 245–246° C. and having an intrinsic viscosity of 0.9. It was fibre-forming from the melt.

Example 5

A 1:1 molar copolymer of 6-oxycaprol units with hexamethylene adipamide units was prepared by the reaction of hexamethylene diammonium adipate (62 parts) with ε-caprolactone (27 parts) in the presence of p-toluene sulphonic acid (0.05 part) using the reaction conditions described in Example 2 for the 2:1 copolymer. The product was a white, crystalline solid polymer, melting over 190–195° C. and having an intrinsic viscosity of 0.64.

Example 6

A 9:1 molar copolymer of 6-oxycaproyl units with hexamethylene adipamide units was prepared by the reaction of hexamethylene diammonium adipate (20.7 parts) with ε-caprolactone (81 parts) in the presence of p-toluene sulphonic acid (0.05 part) as catalyst. The general procedure was as in Example 4, but reactions employing high molar proportions of caprolactone are generally slower than those with lower molar proportions so that the mixture was maintained at 260° C./0.05 mm. Hg for 15 hours after reducing the pressure from atmospheric. The product was a yellowish-white translucent solid, capable of producing fibres from the melt. It was crystalline to X-rays and melted over 90–93° C. Infra-red spectral information showed that the amide groups were still fully hydrogen bonded. Its intrinsic viscosity was 0.54.

When used as a hot-melt adhesive, this copolymer gave strong bonds between zinc/zinc, aluminum/aluminum, mild steel/mild steel, and cardboard/cardboard specimens. Neither nylon-6,6 nor poly(ε-caprolactone) was useful for this application.

Example 7

A 15:1 molar copolymer of 6-oxycaproyl units with hexamethylene adipamide units was prepared by the reaction of hexamethylene diammonium adipate (12.4 parts) with ε-caprolactone (81 parts) in the presence of p-toluene sulphonic acid (0.05 part) as catalyst. The reaction was carried out according to the method of Example 6 with extension of the heating period at 260° C.0.05 mm. Hg to 17 hours. The product was a semi-transparent crystalline solid, melting over 61–67° C. and having an intrinsic viscosity of 0.50.

Example 8

A 1:1 molar copolymer of 6-oxycaproyl units with hexamethylene sebacamide units was prepared by the reactions of ε-caprolactone (16.2 parts) and hexamethylene diammonium sebacate (45.2 parts) in the presence of p-toluene sulphonic acid (0.05 part) as catalyst. The reactants were melted together under nitrogen at 180–200° C. during 20 minutes. The temperature was then raised to 230–250° C. over 40 minutes whilst the pressure was reduced to 0.05 mm. Hg during 2½ hours, and the reaction was allowed to proceed for a further 24 hours in these conditions. The product after cooling was a translucent solid, crystalline to X-rays, which melted over 176–180° C. Its intrinsic viscosity was 1.1 and strong fibres could be drawn from the melt.

Example 9

A 1:1 molar copolymer of 6-oxycaproyl units with pentamethylene adipamide units was prepared by the reaction of ε-caprolactone (7.6 parts) with pentamethylene diammonium adipate (16.4 parts) in the presence of a trace of p-toluene sulphonic acid as catalyst. The conditions of reaction were as in Example 8, the mixture being heated at 260° C./0.05 mm. Hg for 24 hours. The product was a translucent off-white solid, crystalline to X-rays and fibre-forming. It melted over 181–186° C. and had an intrinsic viscosity of 0.76.

Example 10

A 1:1 molar copolymer of 6-oxycaproyl units with hexamethylene isophthalamide units was prepared by the reaction of ε-caprolactone (5.4 parts) with hexamethylene diammonium isophthalate (13.3 parts) in the presence of p-toluene sulphonic acid (0.05 part) as catalyst. The reactants were heated for 45 minutes under nitrogen at normal pressure and at 200° C. to form a homogeneous melt. The temperature was raised to 220° C. over 15 minutes, and the pressure was reduced to 0.05 mm. Hg whilst increasing the temperature to 260° C., these conditions being maintained for a further 5 hours whilst the viscosity of the melt gradually increased. The product after cooling was a hard clear amorphous resin plasticised by moisture and softening to a viscous liquid at about 126° C.

Example 11

Following essentially the process of Example 3, a polyesteramide was prepared from ε-caprolactone and the nylon salt from hexamethylene diamine and adipic acid. The constituents were arranged to give a polymer which melted over the range 161–163° C. and which contained 67 mole perecnt of —O(CH$_2$)$_5$CO— units.

A number of lap joints were made by heating the polymer between test strips of aluminium, zinc and mild steel at 171° C. and 200 lbs./sq. in. pressure for 5 minutes. The bonded strips were cooled to room temperature while still under pressure. After 24 hours, the shear strength of these bonded strips were determined using a Type W Hounsfield Tensometer and a withdrawal rate of 0.25 in./min. The results, which are the mean of at least 4 determinations in each case, are summarised in the following table which also contains values determined for wood, cardboard and glass specimens as adherends joined with the same copolymer.

TABLE 1
SHEAR TESTS FOR COPOLYMER BASED UPON 67% CAPROLACTONE (M.P. 161-3° C.)

| Adherends | Breaking stress, lb./in.$^2$ | Type of Failure* |
|---|---|---|
| Wood–Wood | 550 | C+M |
| Aluminum–Aluminum | 640 | A |
| Zinc–Zinc | 560 | A |
| Cardboard–Cardboard | 80 | M |
| Glass–Glass | 330 | M |
| Mild Steel–Mild Steel | 1,090 | A+C |

*M=Material failure; C=Cohesive failure; A=Adhesive failure.

Example 12

Following essentially the process of Example 6, a polyesteramide was prepared from ε-caprolactone and the nylon salt of hexamethylene diamine and adiptic acid. The constituents were arranged to give a polymer which melted over 113–115° C. and which contained 83 mole percent of —O(CH$_2$)$_5$CO— units.

Lap joints were prepared as described in Example 11 and bond strengths are recorded in Table 2.

TABLE 2
SHEAR TESTS FOR COPOLYMER BASED UPON 83%CAPROLACTONE (M.P. 113-115° C.)

| Adherends | Breaking stress, lb./in.$^2$ | Type of Failure* |
|---|---|---|
| Wood–Wood | 675 | C |
| Aluminum–Aluminum | 540 | A |
| Do.[1] | 505 | A |
| Zinc–Zinc | 295 | A |
| Cardboard–Cardboard | 40 | M |
| Glass–Glass | 505 | M |
| Mild Steel–Mild Steel | 1,175 | A+C |
| Rigid PVC–Rigid PVC | 480 | A |

[1] Bonded strips soaked in water for 67 hours at 20° C.

Example 13

A polyesteramide containng 90 mole percent of units having the structure —O—(CH$_2$)$_5$—CO— and 10 mole percent of units having the structure

—NH—(CH$_2$)$_6$—NH—CO—(CH$_2$)$_4$—CO— and melting at 90–93° C. was used as the bond between two strips of rigid PVC from which a lap joint was prepared as described in Example 11. This joint had a breaking stress at 595 lbs./sq. in. and failure was a combination of adhesive and cohesive.

Example 14

The polyesteramide of Example 13 was used to make lap joints between a number of materials, the joints being prepared as described in Example 11. Peel tests were performed on these joints using a Goodbrand Tensometer at a withdrawal rate of 4½ ins./min. The results, which are the mean of at least four determinations, are tabulated below.

TABLE 3
PEEL TESTS FOR COPOLYMER BASED UPON 90% CAPROLACTONE

| Adherend: | Peel strength (lb./in.) |
|---|---|
| Full chrome leather-full chrome leather (unprimed) | 20 |
| Gristle rubber-Gristle rubber | 12 |
| "Neolite"-"Neolite" | 10 |
| Black rubber-Black rubber (soling compound) | 7 |
| Rigid PVC-"Vynide" | 6 |

Example 15

A copolymer composed of 50 mole percent of 6-oxycaproyl units, 25 mole percent pentamethylene adipamide units and 25 moles percent hexamethylene adipamide units was prepared by the reaction of ε-caprolactone (3.8 parts) with pentamethylene diammonium adipate (4.1 parts) and hexamethylene diammonium adipate (4.4 parts). The reactants were heated together for 30 minutes at 210° C. under nitrogen to form a homogeneous melt. The nitrigen flow was then increased to displace volatile reaction products and the temperature was raised to 260–270° C. and these conditions were maintained for a further 4 hours.

The product obtained after cooling was a translucent yellow solid melting over the range 157–160° C. Fibres could be drawn from the melt. A 0.5% solution had a reduced viscosity of 0.68 decilitre gm.$^{-1}$ in m-cresol at 25° C.

Example 16

A copolymer composed of 67 mole percent of 6-oxycaproyl units, 16.5 mole percent of hexamethylene adipamide units and 16.5 mole percent of p-xylylene adipamide units was prepared by the reaction of ε-caprolactone (22.8 parts) with hexamethylene diammonium adipate (13.1 parts) and p-xylylene diammonium adipate (14.0 parts).

The reactants were heated together at 270° C. during 15 minutes under nitrogen to form a homogeneous melt. The temperature was then reduced to 250° C. and a rapid nitrogen flow established to remove volatile reaction products. These conditions were maintained for a further 18 hours when the reaction was discontinued.

The product obtained after cooling was a white crystalline solid material melting over the range 176–182° C. It was fibre forming from the melt. A 0.5% solution had a reduced viscosity of 0.53 decilitre gm.$^{-1}$ in m-cresol at 25° C.

Example 17

A copolymer composed of 60 mole percent of 6-oxycaproyl units and 40 mole percent of hexamethylene terephthalamide units were prepared by the reaction of ε-caprolactone (43.3 parts) with hexamethylene diammonium terephthalate (71.2 parts). These reactants were heated together for 1¼ hours at 270° C. under nitrogen to form a homogeneous melt. The temperature of the mixture was then lowered to 260° C. and a rapid nitrogen flow established to remove volatile reaction products. These conditions were maintained for a further 1½ hours.

The product obtained after cooling was a white crystalline solid material, melting over the range 245–247° C. Fibres could readily be drawn from the melt. A 0.5% solution in m-cresol had a reduced viscosity of 0.54 decilitre gm.$^{-1}$.

Example 18

A copolymer of 4 molar proportions of 6-oxycaproyl units with 1 molar proportion of 4:4'-oxydiphenylene adipamide units was prepared by the reaction of ε-caprolactone (10.8 parts) with adipic acid (3.45 parts) and 4:4'-diaminodiphenyl ether (4.74 parts). These reactants were melted together under nitrogen at 200° C., and after ½ hour the temperature was increased to 240° C. and the reactants maintained under a rapid nitrogen flow for a further 21 hours. The product obtained after cooling was a tough crystalline white solid melting over the range 156–170° C. The reduced viscosity of a 0.5% solution in m-cresol at 25° C. was 0.63 decilitre gm.$^{-1}$.

Example 19

A copolymer of 2 molar proportions of 6-oxycaproyl units with 1 molar proportion of 4:4'-sulphonyldiphenylene adipamide units was prepared by the reaction of ε-caprolactone (10.8 parts) with adipic acid (6.92 parts) and 4:4'-diaminodiphenyl sulphone (11.74 parts). The procedure was as exercised in Example 18 except that 24 hours reaction time was allowed at 240° C. The product obtained after cooling was a hard transparent glassy material which did not adhere to a heated metal bar (Kofler) below 80° C. The reduced viscosity of a 0.5% solution in m-cresol at 25° C. was 0.28 decilitre gm.$^{-1}$.

Example 20

A 4:1 molar copolymer of 6-oxycaproyl units with p-xylylene adipamide units was prepared by the reaction of ε-caprolactone (32.3 parts) with p-xylylene diammonium adipate (20.0 parts). These reactants were melted together under nitrogen at 255° C. and maintained under a rapid flow of nitrogen at 250° C.–270° C. for 24 hours. The pressure in the reaction vessel was then reduced to 0.05 mm. Hg whilst continuing to heat at the same temperature for a further 5 hours.

The product obtained after cooling was a tough opaque resin, slightly yellow in colour, with a melting point of 125° C. Fibres could readily be spun from the melt. The reduced viscosity of a 0.5% solution in m-cresol at 25° C. was 0.90 decilitres/gm.

Example 21

A copolymer containing 50 mole percent of 6-oxycaproyl units with 16.7 moles percent hexamethylene terephthalamide, 16.7 moles percent hexamethylene isophthalamide and 16.7 moles percent hexamethylene decane-1:10 dicarbonamide units was prepared by the reaction of ε-caprolactone (7.56 parts) with hexamethylene diammonium terephthalate (6.2 parts), hexamethylene diammonium isophthalate (6.2 parts) and hexamethylene diammonium dodecane-1:12-dioate (7.6 parts).

The reaction conditions were as described in Example 19.

The product obtained after cooling was a tough translucent material which crystallised slowly on standing. The crystalline material melted over the range 144–150° C. and the reduced viscosity of a 0.5% solution in m-cresol at 25° C. was 0.69 decilitre gm.$^{-1}$.

Example 22

A 4:1 molar copolymer of 6-oxycaproyl units with hexamethylene diphenylmethane-4:4'-dicarbonamide units was prepared by the reaction of ε-caprolactone (7.0 parts) with hexamethylene diammonium diphenyl methane-4:4'-dicarboxylate (4.0 parts) following essentially the same procedure as described in Example 15.

The product obtained after cooling was a yellow transparent brittle resin which did not adhere to a heated bar (Kofler) below about 70° C. The reduced viscosity of a 0.5% solution in m-cresol at 25° C. was 0.35 decilitre gm./$^{-1}$.

Example 23

A copolymer composed of 50 mole percent of 6-oxycaproyl units, 16.7 mole percent hexamethylene adipamide units, 16.7 mole percent hexamethylene suberamide units and 16.7 mole percent hexamethylene decane-1:10-dicarbonamide units was prepared by the reaction of ε-caprolactone (5.4 parts) with hexamethylene diammonium adipate (4.14 parts), hexamethylene diammonium suberate (4.60 parts) and hexamethylene diammonium dodecane-1:12-dioate (5.50 parts).

The reaction conditions were similar to those described in Example 15 except that 18 hours was allowed at 240° C.

The product obtained after cooling was a tough translucent resin possessing a low degree of crystallinity to X-rays. Examination by hot-stage microscopy showed that the material commenced to flow over the range of 144–147° C. The reduced viscosity of a 0.5% solution in m-cresol at 25° C. was 0.96 decilitre gm.$^{-1}$.

Example 24

A copolymer composed of 60 mole percent of 6-oxycaproyl units, 20 mole percent hexamethylene isophthalamide units and 20 mole percent hexamethylene terephthalamide units was prepared by the reaction of ε-caprolactone (10.8 parts) with hexamethylene diammonium isophthalate (8.9 parts) and hexamethylene diammonium terephthalate (8.9 parts).

These reactants were melted together at 240° C. under nitrogen and maintained for 17 hours at this temperature to obtain a high molecular weight polymer.

The product obtained after cooling was a tough transparent solid from which a film was moulded at 150° C. under a pressure of lbs./sq. in. pressure. The film had the following mechanical properties:

Breaking stress _____ dyne/cm.$^2$__ 3.8×10$^8$
Initial modulus _____ dyne/cm.$^2$__ 1.0×10$^{10}$
Elongation at break _____ percent__ 68

The reduced viscosity of a 0.5% solution in m-cresol at 25° C. was 0.80 decilitre gm.$^{-1}$.

Example 25

Poly(hexamethylene adipamide) (20 parts) and poly-ε-caprolactone (2 parts) were heated together at 270° C. under nitrogen. The mixture was initially inhomogeneous, but after stirring for 24 hours a single liquid phase was produced. On cooling, a solid product was obtained, similar in properties to a copolyesteramide of the same net composition produced from ε-caprolactone and hexamethylene diammonium adipate, according to the method of previous examples. A sample of the powdered product was extracted for 24 hours in a Soxhlet extractor with boiling toluene, when only 4% of the material was extracted. Poly-ε-caprolactone is wholly soluble in boiling toluene, and this result therefore indicates that units derived from the homopolyester have entered into the polyamide chain.

Example 26

A copolymer composed of 97.5 mole percent of 6-oxycaproyl units and 2.5 mole percent of hexamethylene adipamide units was prepared by the reaction of ε-caprolactone (270 parts) with hexamethylene diammonium adipate (16 parts) according to the method of Example 15. The product obtained after cooling was a white, crystalline solid melting over the range 60–61° C., and the reduced viscosity of a 0.5% solution in m-cresol at 25° C. was 0.72 decilitre gm.$^{-1}$.

Example 27

A solid crystalline copolymer was made by the reaction of ε-caprolactone (119 parts) with hexamethylene diammonium adipate (137 parts) in the presence of p-toluene sulphonic acid (0.05 part).

The reactants were heated at 215–220° C. under nitrogen for 45 minutes during which time a homogeneous melt was obtained. The temperature of the reactants was then increased to 220–225° C. and the pressure reduced gradually to 0.05 mm. Hg over 30 minutes. These conditions were maintained for a further 17 hours. The temperature of the melt was then increased to 260° C. and the reaction discontinued after a further six hours.

The product obtained on cooling was a solid crystalline material melting over the range of 145–150° C. The reduced viscosity of a 0.5% solution in m-cresol at 25° C. was 0.70 decilitre gm.$^{-1}$. Fibres could be drawn from the melt.

A moulded specimen had the following mechanical properties:

Yield stress _____ dynes/cm.$^{-2}$__ 1.5 x 10$^8$
Initial modulus _____ dynes/cm.$^{-2}$__ 1.8 x 10$^9$
Elongation at break _____ percent__ 320

Example 28

An essentially similar reaction to that described in Example 5 was used to prepare a 1:1 molar copolymer of 6-oxycaproyl units with hexamethylene adipamide units.

The product was a white crystalline solid polymer melting over 190–196° C. and having an intrinsic viscosity (in m-cresol at 25° C.) of 0.80 decilitre gm.$^{-1}$. Fibres were spun from the melt and drawn to a draw ratio of 6.25:1. The resultant yarns had the following properties: tenacity 1.5 gm./denier, extensibility 25%, and initial modulus (for 100% extension) 7.7 gm./denier, a clear film was also produced by moulding the copolymer at 204° C. The mechanical properties of this film were as follows: yield stress=2.4×10$^8$ dynes cm.$^{-2}$, initial modulus=3.9×10$^9$ dynes cm.$^{-2}$ and the elongation at break was 65%.

Example 29

A copolymer composed of 4 molar proportions of 6-oxycaproyl units to 1 molar proportion of hexamethylene terephthalamide was prepared by the reaction of ε-caprolactone (21.6 parts) and hexamethylene diammonium terephthalate (13.3 parts) in the presence of p-toluene sulphonic acid (0.050 part).

The reactants were heated at 260–280° C. for 30 minutes under nitrogen to obtain a homogeneous melt. The pressure was then reduced to 0.1 mm. Hg and these conditions maintained for a further 28 hours.

After cooling, a solid crystalline product was obtained, which melted over 146–153° C. The material was melt spun to fibres which showed elastic properties (recoverable extension 250%). The reduced viscosity of a 0.5% solution of the polymer in m-cresol at 25° C. was 0.68 decilitre gm.$^{-1}$. A film of the copolymer produced by moulding at 158° C. had the following mechanical properties: yield stress=4.6×10$^7$ dynes cm.$^{-2}$, initial modulus=8.4×10$^8$ dynes cm.$^{-2}$ and the elongation at break was 200%. The copolymer showed excellent adhesion for metal adherends, particularly aluminium for which joint shear values in excess of 1,000 lb./in. were observed.

We claim:
1. A polyesteramide which is a crystalline solid melting or softening above 60° C. and containing macromolecular chains consisting essentially of caprolactone residues of the structure —O—(CH$_2$)$_5$—CO— and diamide units of the structure —NH—(CH$_2$)$_6$—NH—CO—R'—CO—, where R' is selected from the group consisting of
—(CH$_{2m}$—
where m is a whole number of 4 to 12, and paraphenylene, said units being in a random or block relationship and the molar ratio of said caprolactone residues to said diamide units being from 1:20 to 50:1 where R' is —(CH$_2$)$_m$—, and from 30:35 to 50:1 where R' is paraphenylene said polyesteramide having been produced by the process of claim 14.

2. A polyesteramide according to claim 1 in which each R' is —(CH$_2$)$_4$—.

3. A polyesteramide according to claim 1 in which each R' is —(CH$_2$)$_8$—.

4. A polyesteramide according to claim 1 in which each R' is selected from the group consisting of —(CH$_2$)$_4$—, —(CH$_2$)$_6$— and —(CH$_2$)$_{10}$—.

5. A polyesteramide according to claim 1 in which the ratio of caprolactone residues to said diamide units in the macromolecular chains is from 0.1:1 to 2:1.

6. A polyesteramide according to claim 1 in which the ratio of caprolactone residues to said diamide units in the macromolecular chains is from 2:1 to 40:1.

7. A polyesteramide according to claim 1 in which the ratio of caprolactone units to said diamide units in the macromolecular chains is from 4:1 to 20:1.

8. A polyesteramide according to claim 1 in which each R' is selected from para-phenylene and —(CH$_2$)$_4$—.

9. A polyesteramide according to claim 1 having an intrinsic viscosity (measured on a solution of the polymer in m-cresol at 25° C.) from 0.4 to 2.0.

10. A shaped article of a polyesteramide according to claim 1.

11. A self-supporting film of a polyesteramide according to claim 1.

12. A fibre of a polyesteramide according to claim 1.

13. A melt adhesive comprising a polyesteramide according to claim 1 which has a melting point or softening point of from 60° to 180° C.

14. A process for the production of a polyesteramide which comprises the steps of (A) reacting:
(1) a compound selected from the group consisting of ε-caprolactone, 6-hydroxycaproic acid, 6-acyl oxycaproic acid and lower alkyl esters of said acids with
(2) either (i) a polyamide formed of repeating units of the structure

—NH—(CH$_2$)$_6$—NH—CO—R'—CO— where R' is selected from the group consisting of p-phenylene and —(CH$_2$)$_m$—, where m is from 4 to 12, or (ii) material from which said polyamide may be formed, which material is selected from the group consisting of (a) substantially equimolar amounts of hexamethylene diamine and a dicarboxylic acid of the structure HOOC—R'—COOH, where R' is selected from the group consisting of p-phenylene and —(CH$_2$)$_m$—, where m is from 4 to 12, and (b) the corresponding hexamethylene diammonium carboxylate, the molar ratio of (1) to (2) being from 1:20 to 50:1 when R' is —(CH$_2$)$_m$, and from 30:35 to 50:1 when R' is paraphenylene, and the reaction being effected by heating the mixture at a temperature of from 150° C. to 300° C. until a crystalline polyesteramide melting or softening above 60° C. is obtained, and (B) recovering said polyesteramide.

15. A process according to claim 14 in which the reactants are first melted together at a temperature of up to 220° C. and are then subjected to a higher temperature within the range 210° C. to 270° C.

16. A process according to claim 14 in which the final part of the reaction is effected under a vacuum corresponding to an absolute pressure of less than 1 mm. of mercury.

References Cited

UNITED STATES PATENTS 2,547,113 4/1951 Drewitt et al. _____ 260—75
2,946,769 7/1960 Rose et al. _____ 260—75

WILLIAM H. SHORT, Primary Examiner

L. L. LEE, Assistant Examiner

U.S. Cl. X.R.

260—47, 65, 75, 78.3